US012513807B2

(12) United States Patent
Shin

(10) Patent No.: US 12,513,807 B2
(45) Date of Patent: Dec. 30, 2025

(54) X-RAY SOURCE DRIVING CIRCUIT, AND X-RAY GENERATION DEVICE USING SAME

(71) Applicants: VATECH Co., Ltd., Gyeonggi-do (KR); VATECH EWOO Holdings Co., Ltd., Gyeonggi-do (KR)

(72) Inventor: Seung Hun Shin, Gyeonggi-do (KR)

(73) Assignees: VATECH Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 232 days.

(21) Appl. No.: 18/270,059

(22) PCT Filed: Dec. 31, 2021

(86) PCT No.: PCT/KR2021/020364
§ 371 (c)(1),
(2) Date: Jun. 28, 2023

(87) PCT Pub. No.: WO2022/146104
PCT Pub. Date: Jul. 7, 2022

(65) Prior Publication Data
US 2024/0064886 A1 Feb. 22, 2024

(30) Foreign Application Priority Data
Dec. 31, 2020 (KR) ........................ 10-2020-0188717

(51) Int. Cl.
*H05G 1/12* (2006.01)
*H05G 1/08* (2006.01)
(Continued)

(52) U.S. Cl.
CPC ............... *H05G 1/12* (2013.01); *H05G 1/085* (2013.01); *H05G 1/265* (2013.01); *H05G 1/34* (2013.01)

(58) Field of Classification Search
CPC .......... H05G 1/12; H05G 1/085; H05G 1/265; H05G 1/34
See application file for complete search history.

(56) References Cited

U.S. PATENT DOCUMENTS

2008/0144774 A1* 6/2008 Mortor .................... H01J 35/04
378/140
2013/0022173 A1 1/2013 Jeong et al.
(Continued)

FOREIGN PATENT DOCUMENTS

KR 10-2010-0007046 A 1/2010
KR 10-2016-0089123 A 7/2016
(Continued)

OTHER PUBLICATIONS

Hayashida et al., JP 4987498 B2 and its English translation (Year: 2012).*
(Continued)

*Primary Examiner* — Chih-Cheng Kao
(74) *Attorney, Agent, or Firm* — IP Legal Services, LLC

(57) ABSTRACT

An X-ray source driving circuit and an X-ray generation device using the same are proposed. An objective of the present disclosure is to provide an X-ray source driving circuit having a low possibility of dielectric breakdown and capable of reducing an insulation distance between high voltage circuits, and to provide an X-ray generation device of which the size and weight may be reduced by using the same. To this end, the X-ray generation device includes an X-ray source including a cathode electrode, an anode electrode, and a gate electrode and configured to generate X-rays with a driving voltage applied to each electrode, a first voltage converter including a first transformer and at least one voltage multiplier for multiplying a first voltage output from the first transformer, and a second voltage converter
(Continued)

including a second transformer and a voltage multiplier for multiplying a second voltage output from the second transformer.

15 Claims, 8 Drawing Sheets

(51) Int. Cl.
*H05G 1/26* (2006.01)
*H05G 1/34* (2006.01)

(56) References Cited

U.S. PATENT DOCUMENTS

| | | | | |
|---|---|---|---|---|
| 2014/0146943 | A1 | 5/2014 | Aoki et al. | |
| 2018/0184990 | A1 * | 7/2018 | Shin | H05G 1/12 |
| 2018/0192972 | A1 | 7/2018 | Shin et al. | |

FOREIGN PATENT DOCUMENTS

| | | | |
|---|---|---|---|
| KR | 10-2017-0112777 | A | 10/2017 |
| KR | 10-2019-0072697 | A | 6/2019 |

OTHER PUBLICATIONS

Koyanagi et al., JP 2006-164819 A and its English translation (Year: 2006).*

European Patent Office, Supplementary European Search Report of corresponding EP Patent Application No. 21915901.9, Oct. 14, 2024.

European Patent Office, Extended European Search Report of corresponding EP Patent Application No. 21915901.9, Jan. 14, 2025.

* cited by examiner

X-RAY SOURCE DRIVING CIRCUIT, AND X-RAY GENERATION DEVICE USING SAME

CROSS REFERENCE TO RELATED APPLICATIONS

This application is a National Stage Patent Application of PCT International Patent Application No. PCT/KR2021/020364 (filed on Dec. 31, 2021) under 35 U.S.C. § 371, which claims priority to Korean Patent Application No. 10-2020-0188717 (filed on Dec. 31, 2020), the teachings of which are incorporated herein in their entireties by reference.

TECHNICAL FIELD

The present disclosure relates to an X-ray source driving circuit and an X-ray generation device using the same.

BACKGROUND ART

In order to reduce the size and weight of an X-ray generation device, an electric field emission X-ray source using a cold cathode emitter such as a metal nano tip or a carbon nano tube (CNT) has been commercialized.

Unlike conventional hot cathode filaments for emitting isotropic hot electrons by heating at high temperatures, the electric field emission X-ray source uses the cold cathode emitter for emitting quantum mechanically tunneled anisotropic cold electrons at room temperature. Accordingly, electron emission is enabled by using relatively low electric power and the directivity of electrons is excellent, so the X-ray emission efficiency is very high. In addition, pulsed X-ray emission is easy, and thus the electric field emission X-ray source may be used for video recording.

An X-ray generation device using an electric field emission X-ray source includes: an inverter for converting a direct current (DC) from a power supply into an alternating current (AC) in order to apply an appropriate driving voltage to each of an anode electrode, cathode electrode, and gate electrode of the electric field emission X-ray source; a transformer for boosting the AC voltage to an appropriate level; a voltage multiplier; and the like, wherein a potential difference between the cathode electrode and the gate electrode should be about 5 kV to 10 kV, and a potential difference between the cathode electrode and the anode electrode should be about 50 kV to 100 kV.

Compared to a conventional hot cathode filament method, a typical X-ray generation device using an electric field emission X-ray source requires a potential difference of several kV to ten plus a few more kV between a cathode electrode and a gate electrode and a potential difference of several tens of kV between the cathode electrode and an anode electrode, whereby there is a possibility of dielectric breakdown to occur. In order to increase insulation stability, an insulation distance may be increased or a high voltage shielding structure may be added, but in this method, there is a problem of being contradictory to reducing the size and weight of the X-ray generation device.

DISCLOSURE

Technical Problem

An objective of the present disclosure is to provide an X-ray source driving circuit having a low possibility of dielectric breakdown and capable of reducing an insulation distance between high voltage circuits, and to provide an X-ray generation device of which the size and weight may be reduced by using the same.

Technical Solution

According to the present disclosure for achieving the above objective, there is provided an X-ray generation device including: an X-ray source including a cathode electrode, an anode electrode, and a gate electrode and configured to generate X-rays with a driving voltage applied to each electrode; a first voltage converter including a first transformer and at least one voltage multiplier for multiplying a first voltage output from the first transformer; and a second voltage converter including a second transformer and a voltage multiplier for multiplying a second voltage output from the second transformer, wherein the at least one voltage multiplier of the first voltage converter may generate a cathode voltage and an anode voltage, which have a potential difference between each other from the first voltage, the voltage multiplier of the second voltage converter may generate a gate voltage from the second voltage and substantially insulate a primary side and secondary side of the second transformer by connecting one of secondary side electrodes of the second transformer to the cathode electrode in common, and the at least one voltage multiplier connected to a secondary side of the first transformer and the voltage multiplier connected to the second transformer may form a substantial single circuit having the cathode voltage as a common potential.

According to the present disclosure for achieving the above objective, there is provided an X-ray source driving circuit configured to generate a cathode voltage applied to a cathode electrode, an anode voltage applied to an anode electrode, and a gate voltage applied to a gate electrode in order to drive an X-ray source including the cathode electrode, the anode electrode, and the gate electrode, the X-ray source driving circuit including: a first voltage converter configured to generate, with power supply voltage, the anode voltage and the negative (−) cathode voltage smaller than the anode voltage; and a second voltage converter configured to generate, with the power supply voltage, the gate voltage greater than the cathode voltage and less than the anode voltage on a basis of the cathode voltage.

Advantageous Effects

The present disclosure has an effect of providing an X-ray source driving circuit capable of reducing an insulation distance between high voltage circuits to have a low risk of dielectric breakdown, and providing an X-ray generation device of which the size and weight may be reduced.

MODE FOR INVENTION

Figure 1:
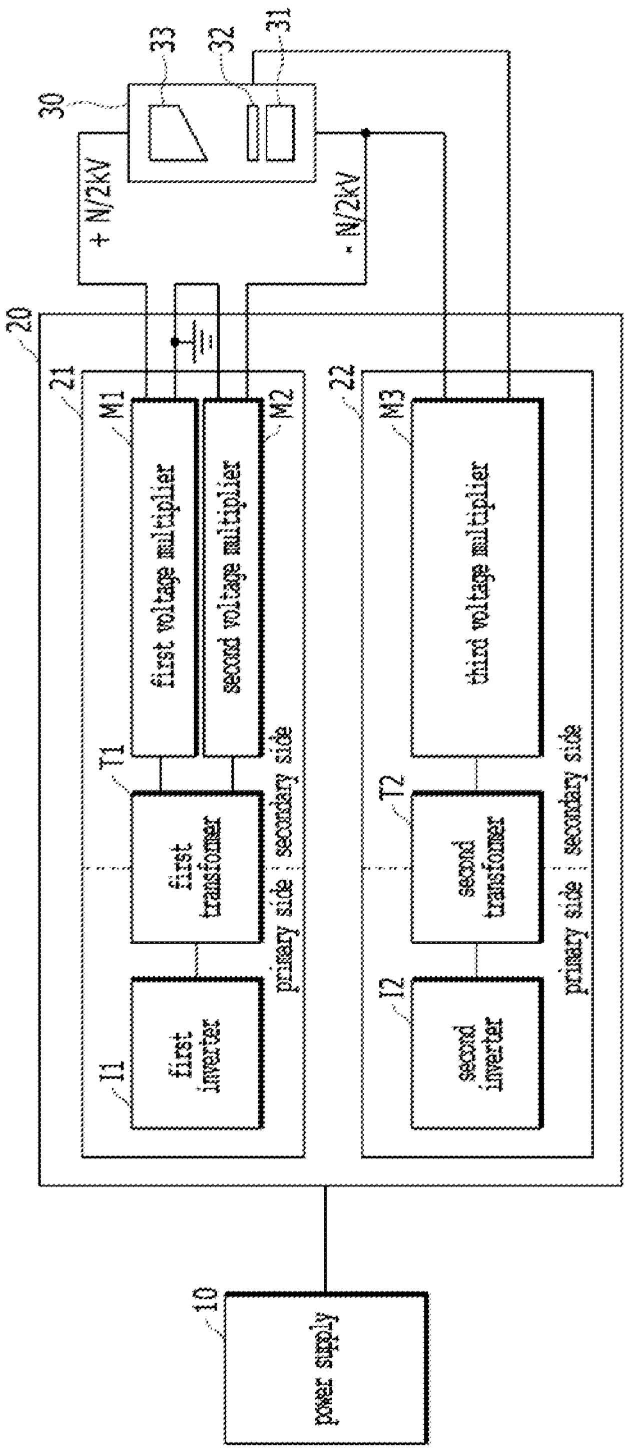
FIG. 1 is a view illustrating an X-ray generation device according to an exemplary embodiment of the present disclosure.

The above-described objective, features, and advantages will become more apparent through the following exemplary embodiments in conjunction with the accompanying drawings.

Specific structures and functional descriptions herein are merely exemplified for the purpose of describing the exemplary embodiments according to a concept of the present disclosure. The exemplary embodiments according to the concept of the present disclosure may be implemented in various forms, and it should not be construed as being limited to the exemplary embodiments described in the specification of the present application.

Since the exemplary embodiments of the concept of the present disclosure can be variously modified in many different forms, specific exemplary embodiments will be illustrated in the drawings and described in detail in the specification of the present application. However, this is not intended to limit the exemplary embodiments in accordance with the concept of the present disclosure to a particular disclosed form. On the contrary, the present disclosure is to be understood to include all various alternatives, equivalents, and substitutes that may be included within the spirit and technical scope of the present disclosure.

When a component is described as being "connected", "coupled", or "linked" to another component, that component may be directly connected, coupled, or linked to that other component. However, it should be understood that a yet another component between each of the components may also be present. In contrast, when a component is described as being "directly connected", "directly coupled", or "directly linked" to another component, it should be understood that there are no intervening components present therebetween. Other expressions for describing a relationship between components, such as "between", "directly between", "adjacent to", or "directly adjacent to" should be construed in the same way.

The terminology used in the specification of the present application is for the purpose of merely describing particular exemplary embodiments, and is not intended to be limiting. As used herein, the singular forms are intended to include the plural forms as well, unless the context clearly indicates otherwise. In the present specification, it will be understood that the terms "comprise", "include", "have", etc., when used in the present specification, specify the presence of stated features, numbers, steps, operations, elements, components, and/or combinations thereof, but do not exclude in advance the presence or addition of one or more other features, numbers, steps, operations, elements, components, and/or combinations thereof.

Unless otherwise defined, all terms used herein have the same meaning as commonly understood by those skilled in the art to which the present disclosure belongs. It will be further understood that terms as defined in dictionaries commonly used herein should be interpreted as having a meaning that is consistent with their meaning in the context of the relevant art, and will not be interpreted in an idealized or overly formal sense unless expressly so defined in the present specification.

Hereinafter, preferred exemplary embodiments of the present disclosure will be described in detail with reference to the accompanying drawings. Throughout the drawings, the same reference numerals will refer to the same or like parts.

Figure 2:
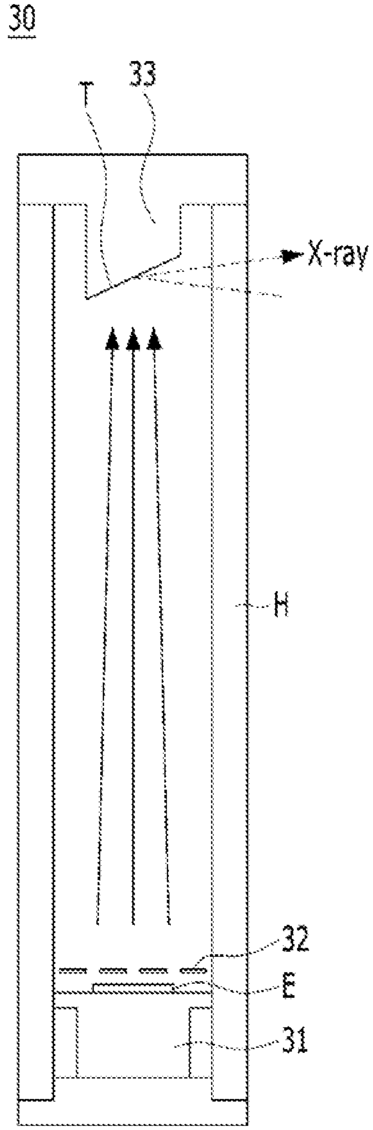
FIG. 2 is a view illustrating an electric field emission X-ray source applicable to the present disclosure.
Figure 3:
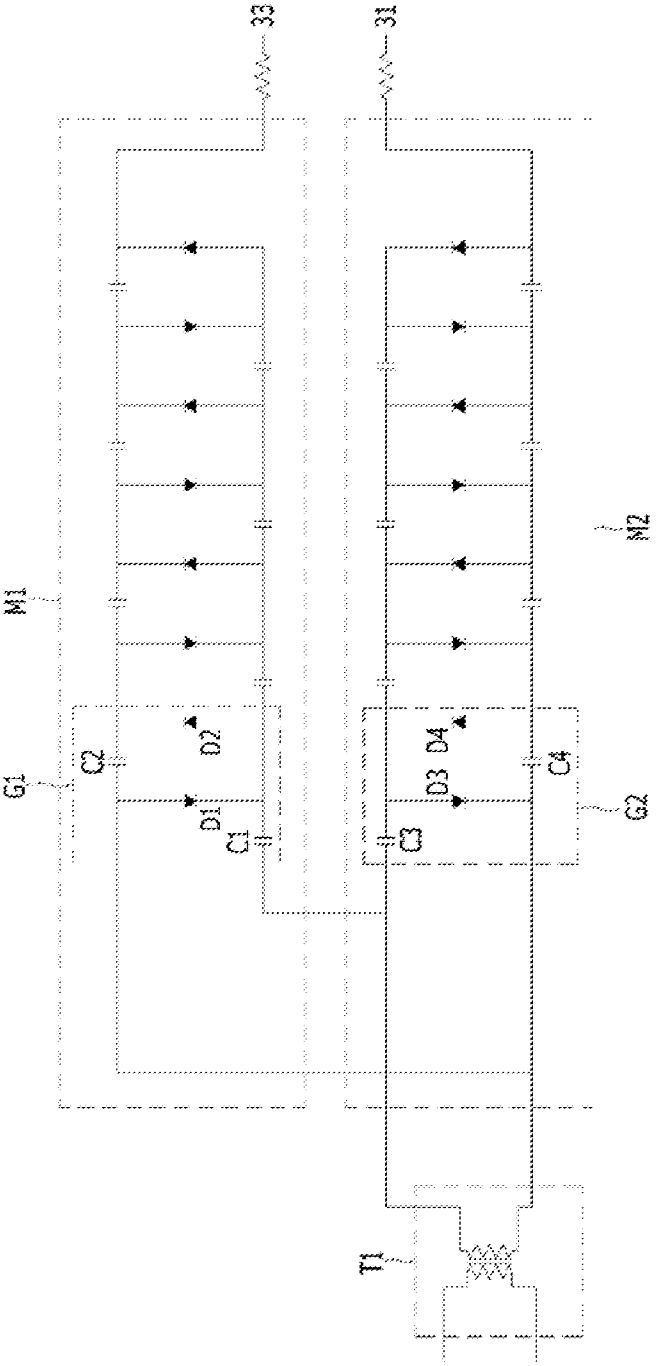
FIG. 3 is a view illustrating a part of a first voltage converter according to the exemplary embodiment of the present disclosure.

FIG. 1 is a view illustrating an X-ray generation device according to an exemplary embodiment of the present disclosure. FIG. 2 is a view illustrating an electric field emission X-ray source applicable to the present disclosure. FIG. 3 is a view illustrating a part of a first voltage converter according to the exemplary embodiment of the present disclosure.

Referring to FIG. 1, the X-ray generation device according to the present exemplary embodiment includes: a power supply 10; a driving voltage generator 20 configured to convert a power supply voltage applied from the power supply 10 into driving voltages of an X-ray source; and an X-ray source 30 configured to generate and emit X-rays with the driving voltages of the driving voltage generator 20.

The power supply 10 provides DC power supply voltage to the driving voltage generator 20. The power supply voltage may be 5 to 30V, e.g., about 24V, and may also be 12V or voltages of different magnitudes. The power supply 10 may be implemented with an adapter for converting commercial AC power into power supply voltage of a predetermined magnitude, or be implemented with various types of batteries for providing DC voltage, and may include a boost circuit for boosting the DC voltage supplied from a power source when required.

The X-ray source 30 generates and emits X-rays with the driving voltages transmitted from the driving voltage generator 20. Referring to FIG. 2, the electric field emission X-ray source 30 applicable to the X-ray generation device according to the present disclosure is provided with a cathode electrode 31 positioned at one end of a tube-shaped vacuum container H, and an emitter E positioned on a first side of the cathode electrode 31, the first side facing the other end of the vacuum container H. The emitter E is provided with electron emission tips implemented with metal nanotips or carbon nanotubes. An anode electrode 33 is positioned at the other end of the vacuum container H, and a target surface T made of tungsten or the like is provided on a first surface of the anode electrode 33, the first surface facing the emitter E. In addition, a gate electrode 32 is positioned between the cathode electrode 31 and the anode electrode 33 inside the vacuum container H. The gate electrode 32 may have a mesh shape through which a plurality of holes corresponding to the respective electron emission tips of the emitter E pass. A focusing electrode for focusing an electric field may be installed between the gate electrode 32 and the anode electrode 31.

The driving voltages for driving the X-ray source 30 include a cathode voltage applied to the cathode electrode 31, a gate voltage applied to the gate electrode 32, and an anode voltage applied to the anode electrode 33. According to the exemplary embodiment of the present disclosure, when the cathode voltage applied to the cathode electrode 31 is set as a reference potential, the anode voltage may have a potential difference of 50 kV to 100 kV, specifically 60 kV to 65 kV, with respect to the reference potential. The gate voltage applied to the gate electrode 32 may have a potential difference of 0.5 kV to 20 kV, specifically about 10 kV, with respect to the reference potential. That is, when a voltage magnitude relationship is established as anode voltage >gate voltage >cathode voltage, and corresponding voltages are applied to the respective electrodes, electrons emitted from the emitter are sufficiently accelerated to emit X-rays. Specific numerical value ranges of the respective anode voltage, gate voltage, and cathode voltage described above may satisfy the tube voltage specifications of the X-ray generation device for each use, but the present disclosure is not limited thereto.

When a gate voltage is applied to the gate electrode 32 while a cathode voltage and an anode voltage are respectively applied to the cathode electrode 31 and the anode electrode 33, electrons are emitted from the emitter E with the gate voltage as a switching signal. Due to a potential difference between the cathode electrode 31 and the anode electrode 33, the emitted electrons pass through the gate electrode 32 having a mesh structure, and are accelerated toward the anode electrode 33 to hit the target surface T, whereby X-rays are generated and emitted.

The driving voltage generator 20 receives power supply voltage applied from the power supply 10 to generate driving voltages, that is, an anode voltage, a gate voltage, and a cathode voltage, and includes first and second voltage converters 21 and 22. The first voltage converter 21 is for generating a cathode-anode voltage of several tens to hundreds of kV, and may include a first inverter I1, a first transformer T1, and first and second voltage multipliers M1 and M2. The second voltage converter 22 is for generating a cathode-gate voltage of several kV to ten plus a few more kV, and includes a second inverter I2, a second transformer T2, and a third voltage multiplier M3. Each of the first and second voltage multipliers M1 and M2 may be implemented with a voltage multiplier circuit for amplifying an input voltage by n times, and may be preferably implemented with a Cockcroft-Walton voltage multiplier circuit. The first inverter I1 of the first voltage converter 21 converts DC voltage provided from the power supply 10 into a first AC voltage. The first transformer T1 boosts the first AC voltage, which is output from the first inverter I1 and input to a primary side thereof, and outputs a first boosted voltage to a secondary side thereof.

The first voltage multiplier M1 multiplies the first boosted voltage output from the first transformer T1 to a positive (+) anode voltage. The second voltage multiplier M2 multiplies the first boosted voltage output from the first transformer T1 to a negative (−) cathode voltage. The third voltage multiplier M3 multiplies a second boosted voltage output from the second transformer T2 to a gate voltage.

Referring to FIG. 3, the first voltage converter may include a first transformer T1, and first and second voltage multipliers M1 and M2. The first and second voltage multipliers M1 and M2 are connected to a secondary side of the first transformer T1. The first voltage multiplier M1 multiplies the voltage output from the secondary side of the first transformer T1 to generate a positive (+) anode voltage, and based on a common potential of the voltage multipliers, the second voltage multiplier M2 multiplies the voltage output from the secondary side of the first transformer T1 to generate a negative (−) cathode voltage. The first and second voltage multipliers M1 and M2 are respectively provided with a plurality of first voltage multiplication stage G1 and a plurality of second voltage multiplication stage G2. In a case where the number of first voltage multiplication stages G1 and the number of second voltage multiplication stages G2 are same, each of an anode voltage and a cathode voltage has the same absolute value, and in a case where the number of first voltage multiplication stages G1 and the number of second voltage multiplication stages G2 are different from each other, each of an anode voltage and a cathode voltage has respective absolute values different from each other.

The plurality of voltage multiplication stages G1 of the first voltage multiplier M1 is connected in parallel with each other. As shown in FIG. 3, each voltage multiplication stage G1 includes: a first capacitor C1 connected to a first electrode on the secondary side of the first transformer T1; a second capacitor C2 connected to a second electrode on the secondary side of the first transformer T1; a first diode D1 disposed between the first capacitor C1 and the second capacitor C2; and a second diode D2 disposed, in an opposite direction to the first diode D1, between the first capacitor C1 and the second capacitor C2. According to a polarity change of the first boosted voltage output from a secondary side winding of the first transformer T1, the first diode D1 and the second diode D2 are connected to respective sides opposite from each other between the first and second capacitors C1 and C2.

The second voltage multiplier M2 includes the plurality of second voltage multiplication stage G2 connected in parallel to each other. As shown in FIG. 3, each second voltage multiplication stage G2 includes: a third capacitor C3 connected to the first electrode on the secondary side of the first transformer T1; a fourth capacitor C4 connected to the second electrode on the secondary side of the first transformer T1; a third diode D3 disposed between the third capacitor C3 and the fourth capacitor C4; and a fourth diode D4 disposed, in an opposite direction to the third diode D3, between the third capacitor C3 and the fourth capacitor C4.

Returning to FIG. 1 again, the second inverter I2 of the second voltage converter 22 converts DC power supply voltage input from the power supply 10 into a second AC voltage. The second transformer T2 boosts the second AC voltage of the second inverter I2 input to a primary side thereof and outputs a boosted second AC voltage to a secondary side thereof. In addition, the third voltage multiplier M3 connects one of secondary side electrodes of the second transformer T2 to the cathode electrode 303 in common, and multiplies the boosted voltage output to the secondary side of the second transformer T2 to generate a gate voltage. That is, when one of the secondary side electrodes of the second transformer T2 is connected to the cathode electrode 31 in common, a reference potential of the second voltage multiplier M2 represents the same (−) potential as the cathode voltage. Accordingly, the second voltage multiplier M2 multiplies the boosted voltage output from the second transformer T2 to a voltage higher than the common reference potential, and generates a gate voltage relatively higher than the cathode voltage and having a negative (−) value. As the third voltage multiplier M3 connects one of the secondary side electrodes of the second transformer T2 to the cathode electrode 31 in common, the primary side and the secondary side of the second transformer T2 are substantially insulated, and the first and second voltage multipliers M1 and M2 connected to the secondary side of the first transformer T1 and the third voltage multiplier M3 including the secondary side of the second transformer T2 become a substantial single circuit having the cathode voltage as a common potential. Accordingly, an insulation distance between the first voltage converter 21 and the second voltage converter 22 may be reduced.

Figure 4:
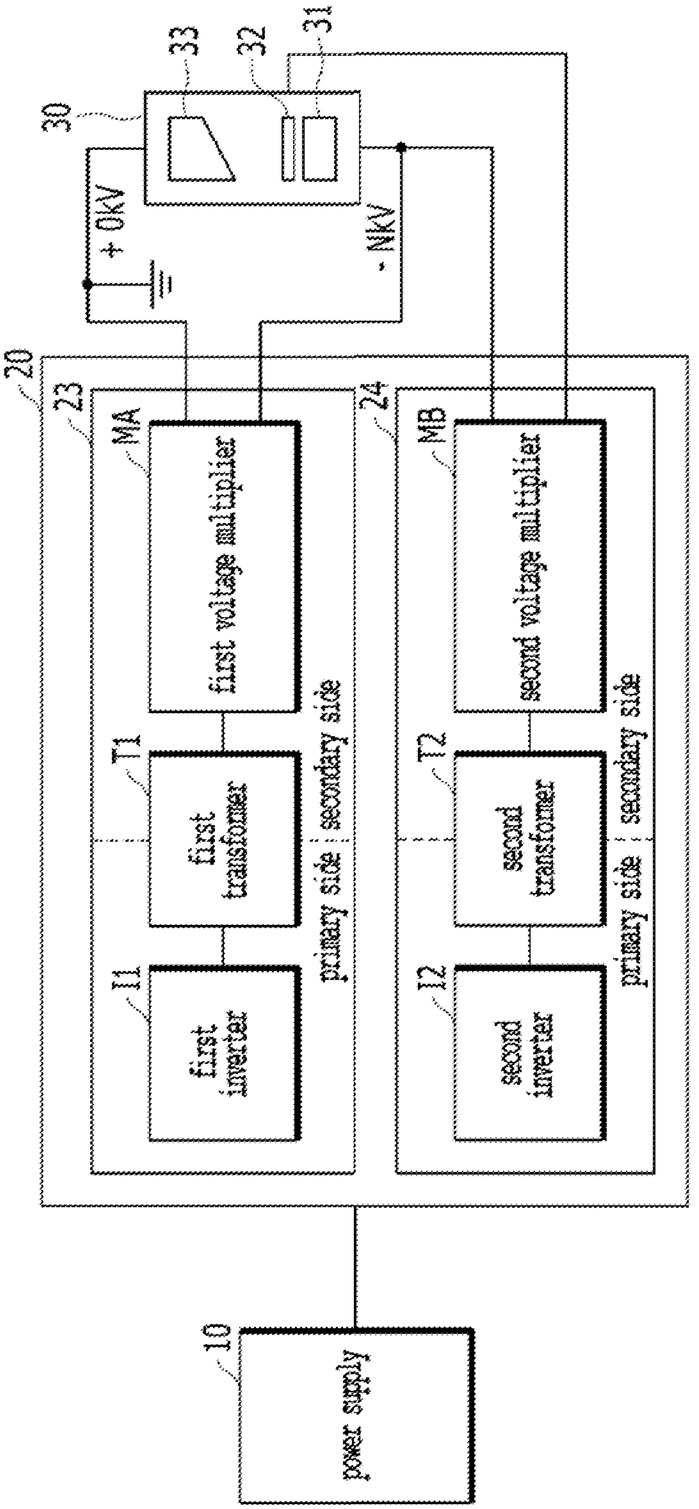
FIG. 4 is a view illustrating an X-ray generation device according to another exemplary embodiment of the present disclosure.

FIG. 4 is a view illustrating an X-ray generation device according to another exemplary embodiment of the present disclosure.

For convenience, the same reference numerals are assigned to common components having the same configurations and operations as those of FIG. 1 to avoid unnecessary redundant description.

Referring to FIG. 4, a driving voltage generator 20 according to the present exemplary embodiment includes first and second voltage converters 23 and 24.

The first voltage converter 23 includes a first inverter I1, a first transformer T2, and a first voltage multiplier MA. The second voltage converter 24 includes a second inverter I2, a second transformer T2, and a second voltage multiplier MB. The first and second voltage multipliers MA and MB may include a voltage multiplier circuit for amplifying an input voltage by n times, and may preferably include a Cockcroft-Walton voltage multiplier circuit. The first voltage multiplier MA of the first voltage converter 23 sets an anode electrode 33 to have a potential as a ground potential, and based on this ground potential, multiplies a boosted voltage output from a secondary side of the first transformer T1 to generate a cathode voltage having a negative (−) value. In addition, the second voltage multiplier MB of the second voltage converter 24 connects one of secondary side electrodes of the second transformer T2 to the cathode electrode 31 in common, multiplies a boosted voltage output from the second transformer T2 to generate a gate voltage having a negative (−) value relatively higher than that of the cathode voltage.

As the second voltage multiplier MB connects the cathode electrode 31 and a secondary side negative (−) electrode of the second transformer T2 to each other in common, a primary side and a secondary side of the second transformer T2 are substantially insulated, and the first voltage multiplier MA connected to the secondary side of the first transformer T1 and the second voltage multiplier MB connected to the secondary side of the second transformer T2 become a substantial single circuit having the cathode voltage as a common potential. Accordingly, an insulation distance between the first voltage converter 23 and the second voltage converter 24 may be reduced.

In addition, as in the present exemplary embodiment, in a case where the anode electrode 33 exhibits the ground potential, the anode electrode 33 exhibits an electrically stable state. Accordingly, there is no difficulty in attaching a conductive cooling system such as a heat radiation fin to the anode electrode 33 where high heat due to electron collision is relatively concentrated, so the overall system may be stabilized. Since the functions and actions of the first inverter I1 and first transformer T1 of the first voltage converter 23 and the second inverter I2 and second transformer T2 of the second voltage converter 24 are substantially the same as those in the above-described exemplary embodiment, a separate description is omitted.

FIGS. 5 to 8 are views illustrating respective X-ray generation devices each including a feedback circuit according to other exemplary embodiments of the present disclosure.

Figure 5:
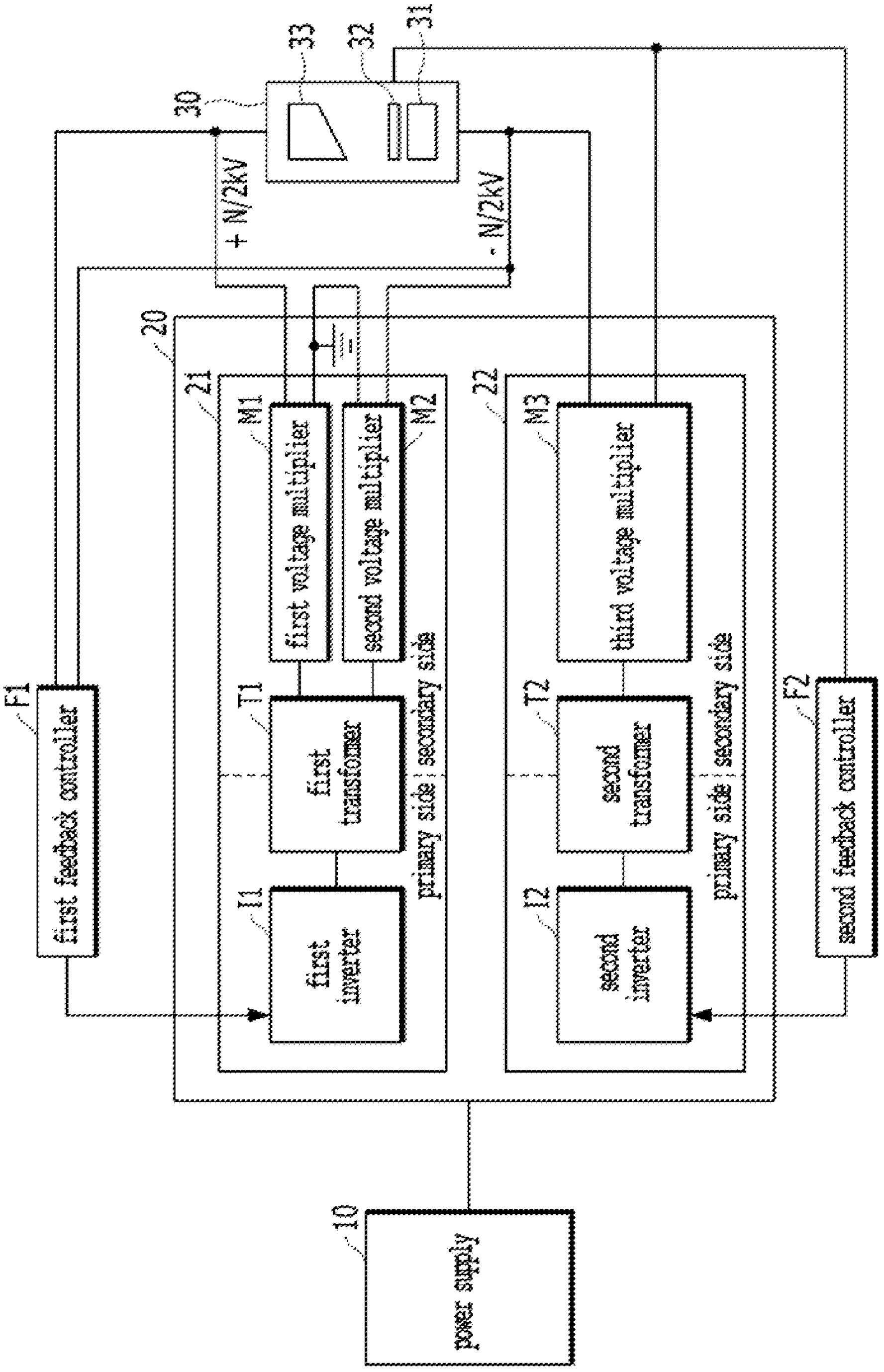
FIGS. 5 to 8 are views illustrating X-ray generation devices, including respective feedback circuits, according to other exemplary embodiments of the present disclosure.

In FIG. 5, a plurality of feedback controllers may be further included in the X-ray generation device in FIG. 1. The X-ray generation device according to the present exemplary embodiment may include a power supply 10, a driving voltage generator 20 configured to convert power supply voltage applied from the power supply 10 into driving voltages of X-ray source, an X-ray source 30 configured to generate and emit X-rays with the driving voltages of the driving voltage generator 20, and first and second feedback controllers F1 and F2.

The first feedback controller F1 calculates respective errors between the anode voltage and cathode voltage and a preset reference voltage, and may control a first voltage converter 21 so that a first inverter I1 maintains an output of constant frequency.

The first feedback controller F1 may include at least one comparator (i.e., an OP-amp) for comparing each of the anode voltage and the cathode voltage with the predetermined reference voltage. A comparator for comparing the anode voltage and the reference voltage may be connected to the anode voltage in common. A comparator for comparing the cathode voltage and the reference voltage may be connected to the cathode voltage in common. The first feedback controller F1 compares each of the anode voltage and the cathode voltage with the reference voltage through the comparators, and adjusts a duty cycle of a pulse input to the first inverter I1, so that respective differences between the anode voltage and cathode voltage and the reference voltage are minimized.

In a case where the number of first voltage multiplication stage G1 and the number of second voltage multiplication stage G2 are same, each of an anode voltage and a cathode voltage has the same absolute value, and in this case, the absolute values of voltage of the anode and cathode, which are connected to the first feedback controller F1, may be the same.

In a case where the number of the first voltage multiplication stage G1 and the number of second voltage multiplication stage G2 are different from each other, the anode voltage and the cathode voltage have absolute values different from each other, and in this case, the absolute values of voltage of the anode and cathode, which are connected to the first feedback controller F1, may be different from each other.

The second feedback controller F2 calculates an error between the gate voltage and the preset reference voltage, and may control the second voltage converter 22 so that the second inverter I2 may maintain an output of constant frequency. The second feedback controller F2 may include a comparator for comparing a gate voltage and a reference voltage. The comparator for comparing the gate voltage and the reference voltage may be connected to the gate voltage in common. The second feedback controller F2 may adjust a duty cycle of a pulse input to the second inverter I2 so that a difference between the gate voltage and the reference voltage is minimized.

Since the functions and actions of the first inverter I1, first transformer T1, and first and second voltage multipliers M1 and M2 of the first voltage converter 21, and the second inverter I2, second transformer T2, and third voltage multiplier M3 of the second voltage converter 22 are substantially the same as those in the above-described exemplary embodiment, a separate description thereof will be omitted.

Figure 6:
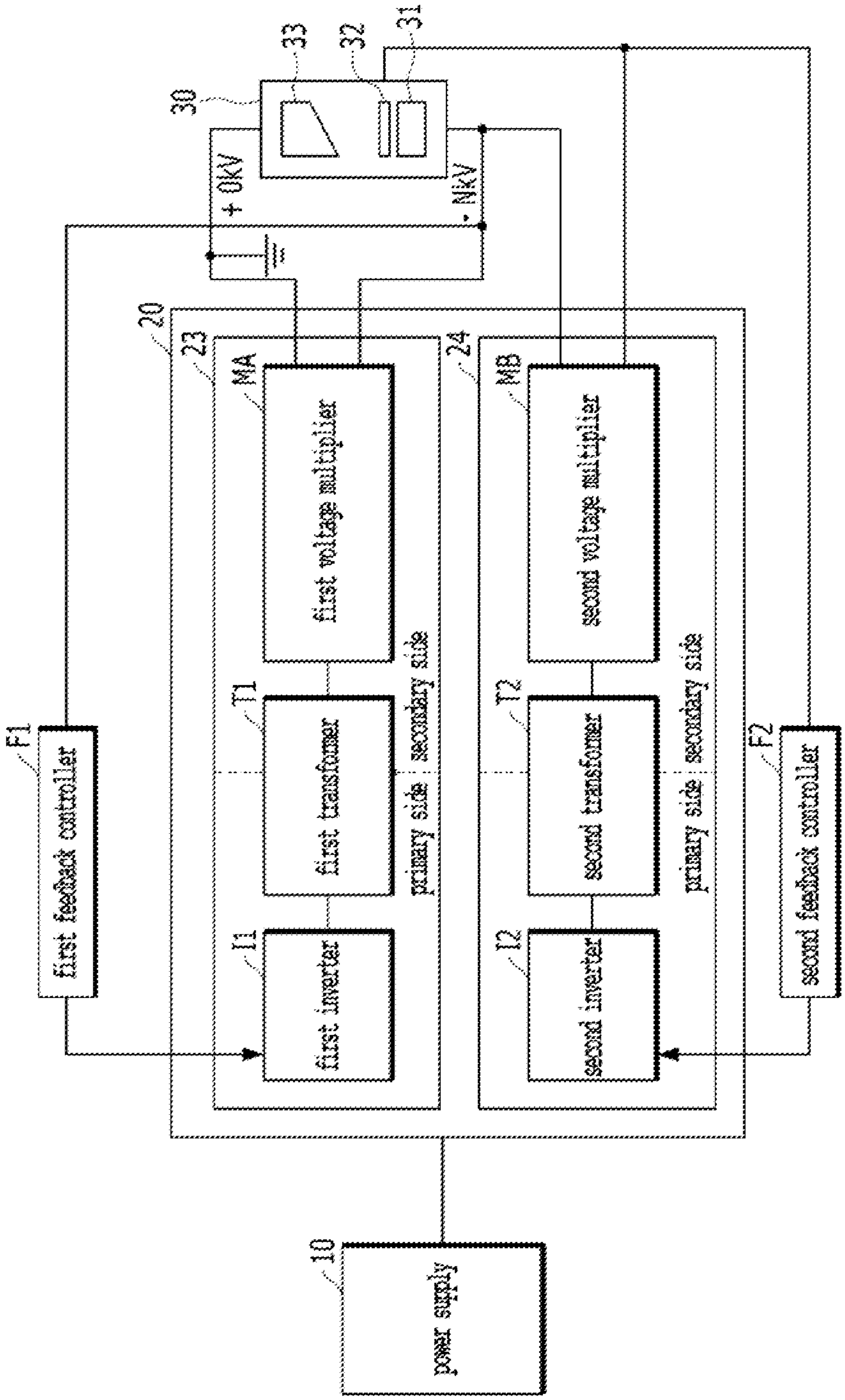

In FIG. 6, a plurality of feedback controllers may be further included in an X-ray generation device in FIG. 4. The X-ray generation device according to the present exemplary embodiment may include a power supply 10, a driving voltage generator 20 configured to convert power supply voltage applied from the power supply 10 into driving voltages of X-ray source, an X-ray source 30 configured to generate and emit X-rays with the driving voltages of the driving voltage generator 20, and first and second feedback controllers F1 and F2. The first and second feedback controllers F1 and F2 may include respective comparators.

The first feedback controller F1 calculates an error between a cathode voltage and a preset reference voltage, and may control a first voltage converter 23 so that a first inverter I1 maintains an output of constant frequency. The first feedback controller F1 may include a comparator for comparing the cathode voltage and the reference voltage. The comparator for comparing the cathode voltage and the reference voltage may be connected to the cathode voltage in common. The first feedback controller F1 may adjust a duty cycle of a pulse input to the first inverter I1 so that a difference between the cathode voltage and the reference voltage is minimized.

The second feedback controller F2 calculates an error between the gate voltage and the preset reference voltage, and may control the second voltage converter 23 so that the second inverter I2 may maintain an output of constant frequency. The second feedback controller F2 may include a comparator for comparing a gate voltage and a reference voltage. The comparator for comparing the gate voltage and the reference voltage may be connected to the gate voltage in common. The second feedback controller F2 may adjust a duty cycle of a pulse input to the second inverter I2 so that a difference between the gate voltage and the reference voltage is minimized.

Since the functions and actions of the first inverter I1, first transformer T1, and first and second voltage multipliers M1 and M2 of the first voltage converter 23 and the second inverter I2, second transformer T2, and third voltage multiplier M3 of the second voltage converter 24 are substantially the same as those in the above-described exemplary embodiment, a separate description thereof will be omitted.

Figure 7:
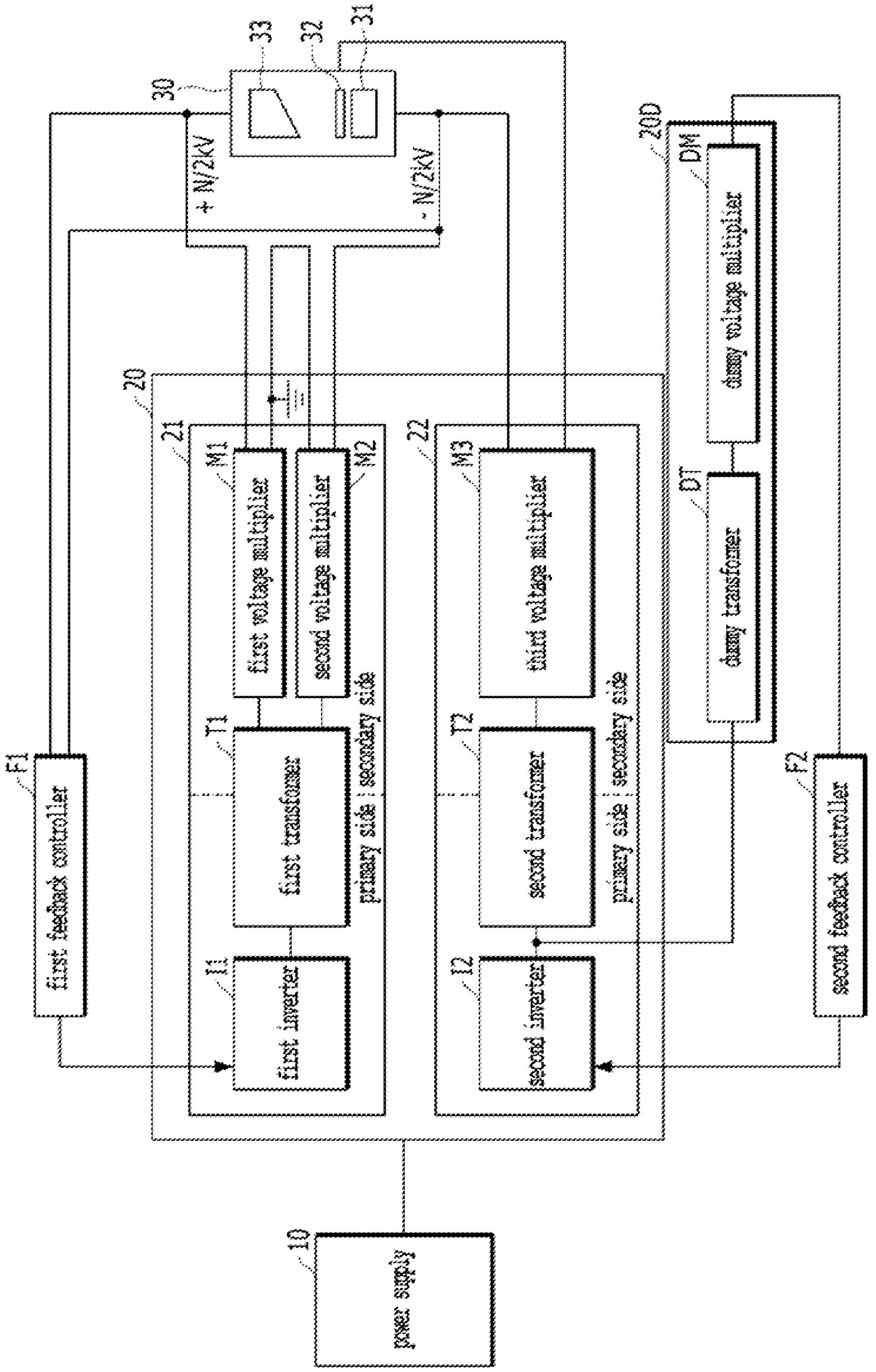

In FIG. 7, in addition to the X-ray generation device of FIG. 1, a plurality of feedback controllers and a dummy transistor may be further included. An X-ray generation device according to the present exemplary embodiment may include a power supply 10, a driving voltage generator 20 configured to convert power supply voltage applied from the power supply 10 into driving voltages of X-ray source, an X-ray source 30 configured to generate and emit X-rays with the driving voltages of the driving voltage generator 20, first and second feedback controllers F1 and F2, and a dummy voltage converter 20D.

The first feedback controller F1 calculates respective errors between an anode voltage and cathode voltage and a preset reference voltage, and may control a first voltage converter 21 so that a first inverter I1 maintains an output of constant frequency.

The first feedback controller F1 may include comparators for respectively comparing the anode voltage and cathode voltage with the predetermined reference voltage. A comparator for comparing the anode voltage and the reference voltage may be connected to the anode voltage in common. A comparator for comparing the cathode voltage and the reference voltage may be connected to the cathode voltage in common. The first feedback controller F1 compares each of the anode voltage and cathode voltage with the reference voltage through the comparators, and adjusts a duty cycle of a pulse input to the first inverter I1, so that respective differences between the anode voltage and cathode voltage and the reference voltage are minimized.

The dummy voltage converter 20D may include a dummy transformer DT and a dummy voltage multiplier DM. The dummy transformer DT and the dummy voltage multiplier DM may include respective circuits same as those of the second transformer T2 and the third voltage multiplier M3 of the second voltage converter 22.

An input terminal of the dummy voltage converter 20D may be connected to an input terminal of the second transformer T2 of the second voltage converter 22 in common. That is, the dummy voltage converter 20D may be connected to a primary side of a second transformer T2 of a second voltage converter 22 in common. The dummy voltage converter 20D generates the same voltage as a gate voltage from an output voltage of the dummy transformer DT through the dummy voltage multiplier DM, and may use the generated voltage as an input signal of the second feedback controller F2.

The second feedback controller F2 calculates an error between a gate voltage and a preset reference voltage, and may control the second voltage converter 22 so that a second inverter I2 may maintain an output of constant frequency. The second feedback controller F2 may include a comparator for comparing a gate voltage and a reference voltage. A comparator for comparing the gate voltage and the reference voltage may be connected to an output terminal of the dummy voltage converter 20D. The second feedback controller F2 compares the voltage input from the dummy voltage converter 20D, that is, the gate voltage, with the reference voltage, and may adjust a duty cycle of a pulse input to the second inverter I2 so that a difference between the gate voltage and the reference voltage is minimized.

Since the functions and actions of the first inverter I1, first transformer T1, and first and second voltage multipliers M1 and M2 of the first voltage converter 21 and the second inverter I2, second transformer T2, and third voltage multiplier M3 of the second voltage converter 22 are substantially the same as those in the above-described exemplary embodiment, a separate description thereof will be omitted.

Figure 8:
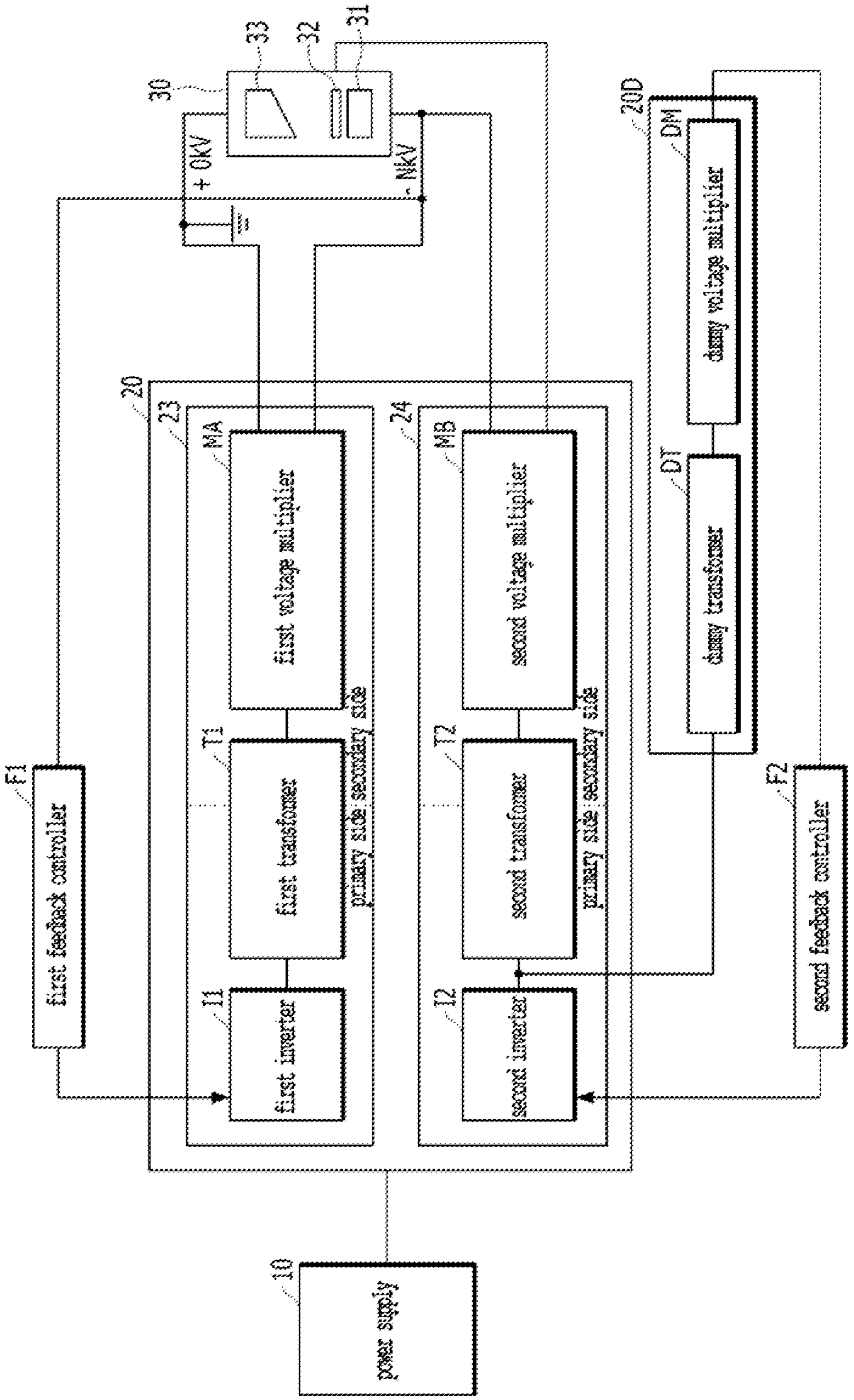

In FIG. 8, in addition to the X-ray generation device of FIG. 4, a plurality of feedback circuits and a dummy transistor may be further included. An X-ray generation device according to the present exemplary embodiment may include a power supply 10, a driving voltage generator 20 configured to convert power supply voltage applied from the power supply 10 into driving voltages of X-ray source, an X-ray source 30 configured to generate and emit X-rays with the driving voltages of the driving voltage generator 20, first and second feedback controllers F1 and F2, and a dummy voltage converter 20D.

The first feedback circuit F1 may be connected to a cathode voltage in common and be connected to the dummy voltage converter 20D.

The first feedback circuit F1 compares the cathode voltage and a reference voltage, and may adjust a duty cycle of a pulse input to a first inverter I1 of a first voltage converter 23 so that a difference between the cathode voltage and the reference voltage is minimized.

The dummy voltage converter 20D may include a dummy transformer DT and a dummy voltage multiplier DM. The dummy transformer DT and the dummy voltage multiplier DM may include respective circuits same as those of the second transformer T2 and the third voltage multiplier M3 of the second voltage converter 22.

An input terminal of the dummy voltage converter 20D may be connected to an input terminal of a second transformer T2 of a second voltage converter 24 in common. That is, the dummy voltage converter 20D may be connected to a primary side of the second transformer T2 of the second voltage converter 24 in common. The dummy voltage converter 20D generates the same voltage as a gate voltage from an output voltage of the dummy transformer DT through the dummy voltage multiplier DM, and may use the generated voltage as an input signal of the second feedback controller F2.

The second feedback controller F2 calculates an error between a gate voltage and a preset reference voltage, and may control the second voltage converter 24 so that a second inverter I2 may maintain an output of constant frequency. The second feedback controller F2 may include a comparator for comparing the gate voltage and the reference voltage. A comparator for comparing the gate voltage and the reference voltage may be connected to an output terminal of the dummy voltage converter 20D. The second feedback controller F2 compares the voltage input from the dummy voltage converter 20D, that is, the gate voltage, with the reference voltage, and may adjust a duty cycle of a pulse input to the second inverter I2 so that a difference between the gate voltage and the reference voltage is minimized.

Since the functions and actions of the first inverter I1, first transformer T1, and first and second voltage multipliers M1 and M2 of the first voltage converter 21 and the second inverter I2, second transformer T2, and third voltage multiplier M3 of the second voltage converter 22 are substantially the same as those in the above-described exemplary embodiment, a separate description thereof will be omitted.

As described above, although the present disclosure has been described with the limited exemplary embodiments and drawings, the present disclosure is not limited to the above exemplary embodiments, and various substitutions, variations, and modifications are possible from such descriptions by those skilled in the art without departing from the technical spirit of the present disclosure.

Therefore, the scope of the present disclosure should not be limited to the described exemplary embodiments, but should be defined by not only the claims to be described later, but also those equivalent to these claims.

The invention claimed is:

1. An X-ray generation device comprising:

an X-ray source comprising a cathode electrode, an anode electrode, and a gate electrode and configured to generate X-rays with a driving voltage applied to each electrode;

a first voltage converter comprising a first transformer and at least one voltage multiplier for multiplying a first voltage output from the first transformer; and a second voltage converter comprising a second transformer and a voltage multiplier for multiplying a second voltage output from the second transformer, wherein the at least one voltage multiplier of the first voltage converter generates a cathode voltage and an anode voltage, which have a potential difference between each other from the first voltage, the voltage multiplier of the second voltage converter generates a gate voltage from the second voltage, and substantially insulates a primary side and secondary side of the second transformer by connecting one of secondary side electrodes of the second transformer to the cathode electrode in common, and the at least one voltage multiplier connected to a secondary side of the first transformer and the voltage multiplier connected to the second transformer form a substantial single circuit having the cathode voltage as a common potential, wherein the X-ray generation device further comprises:

a first feedback controller configured to compare the anode voltage or cathode voltage with a preset reference voltage and control the first voltage converter so that the first voltage maintains an output of constant frequency; and a second feedback controller configured to compare the gate voltage with the reference voltage and control the second voltage converter so that the second voltage maintains an output of constant frequency.

2. The X-ray generation device of claim 1, wherein the gate voltage has a negative (−) value.

3. The X-ray generation device of claim 1, wherein the second voltage converter further comprises an inverter configured to convert power supply voltage into an alternating current (AC) voltage.

4. The X-ray generation device of claim 3, wherein the second transformer comprises the primary side thereof to which the AC voltage is input, and the secondary side thereof from which a boosted voltage of the AC voltage is output, and the voltage multiplier of the second voltage converter multiplies the boosted voltage in a positive (+) direction on a basis of the cathode voltage to generate the gate voltage.

5. The X-ray generation device of claim 1, wherein the anode voltage has a positive (+) value.

6. The X-ray generation device of claim 1, wherein the first voltage converter further comprises an inverter configured to convert power supply voltage into an AC voltage, and the first transformer boosts the AC voltage to output a boosted voltage.

7. The X-ray generation device of claim 6, wherein the at least one voltage multiplier of the first voltage converter comprises a first voltage multiplier configured to multiply the boosted voltage in a positive (+) direction to generate the anode voltage, and a second voltage multiplier configured to multiply the boosted voltage in a negative (−) direction to generate the cathode voltage.

8. The X-ray generation device of claim 1, wherein the anode voltage is a ground potential.

9. The X-ray generation device of claim 8, wherein the first voltage converter further comprises an inverter configured to convert power supply voltage into an AC voltage, the first transformer boosts the AC voltage to output a boosted voltage, and the at least one voltage multiplier multiplies the boosted voltage in a negative (−) direction on a basis of the ground potential to generate the cathode voltage.

10. The X-ray generation device of claim 1, wherein the first feedback controller comprises comparators respectively connected to the anode voltage and the cathode voltage in common and configured to compare each of the anode voltage and the cathode voltage with the reference voltage.

11. The X-ray generation device of claim 1, wherein the anode voltage is a ground potential, and the first feedback controller comprises a comparator connected to the cathode voltage in common to compare the cathode voltage with the reference voltage.

12. The X-ray generation device of claim 1, wherein the second feedback controller comprises a comparator connected to the gate voltage in common to compare the gate voltage with the reference voltage.

13. The X-ray generation device of claim 1, further comprising:

a dummy voltage converter connected to a primary side of a transistor of the second voltage converter in common and configured to output a same voltage as the gate voltage.

14. The X-ray generation device of claim 13, wherein the second feedback controller comprises a comparator configured to compare a voltage output from the dummy voltage converter with the reference voltage.

15. An X-ray source driving circuit configured to generate a cathode voltage applied to a cathode electrode, an anode voltage applied to an anode electrode, and a gate voltage applied to a gate electrode in order to drive an X-ray source comprising the cathode electrode, the anode electrode, and the gate electrode, the X-ray source driving circuit comprising:

a first voltage converter configured to generate, with power supply voltage, the anode voltage and a negative (−) cathode voltage smaller than the anode voltage; and a second voltage converter configured to generate, with the power supply voltage, the gate voltage greater than the cathode voltage and less than the anode voltage on a basis of the cathode voltage wherein the X-ray source driving circuit further comprises:

a first feedback controller configured to compare the anode voltage or cathode voltage with a preset reference voltage and control the first voltage converter so that the first voltage maintains an output of constant frequency; and a second feedback controller configured to compare the gate voltage with the reference voltage and control the second voltage converter so that the second voltage maintains an output of constant frequency.

* * * * *